Patented Nov. 8, 1932

1,886,482

UNITED STATES PATENT OFFICE

BARRY HOCKEN, OF FOWEY, ENGLAND

INDICATING AND CONTROLLING APPARATUS

Application filed November 21, 1927, Serial No. 234,837, and in Great Britain November 30, 1926.

The invention relates to apparatus for effecting addition and indicating the results of such additions and is particularly applicable for indicating purposes in connection with a totalizator wagering system.

The primary object of the invention is to provide an improved apparatus in which the additions or sums are indicated by the level of liquids in tubes.

To save repetition the invention will be hereinafter described in connection with horses although it is to be understood that the invention covers all other similar risks or chances.

A further object of the invention is to provide an apparatus in which indicating tubes are provided to show by liquid level the total amount laid on each horse and also the grand total i. e. the amount laid on all horses.

Preferably a grand total tube is arranged alongside each horse tube so that a visual indication of the approximate odds on each horse is readily given.

In the preferred arrangement of totalizator apparatus constructed in accordance with the invention a number of interconnected stations are arranged with indicator tubes at the same level; on a bet being made at any one station a proportionate displacement of liquid is caused at that station and that causes equal rise (or fall) in liquid level of the indicator tube corresponding to that horse at all stations and also in all the grand total indicators.

In the accompanying drawings which illustrate the invention in a diagrammatic manner, Fig. 1 represents in elevation one station of a fluid level totalizator with item and grand total columns, employing displacing plungers which leave annular spaces between them and the tubes.

Figure 1:
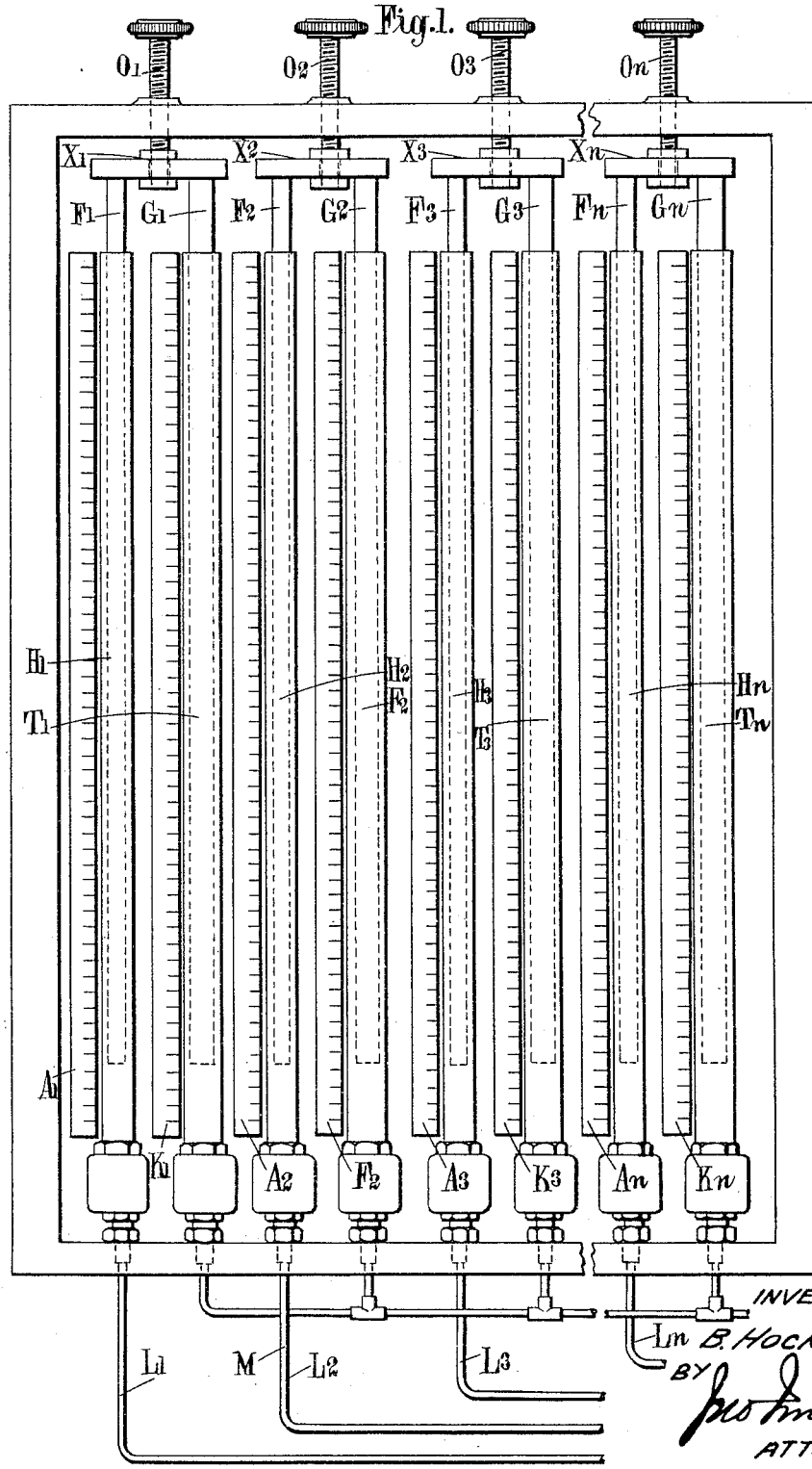

Referring first to Fig. 1 which shows a portion of an apparatus capable of dealing with forty horses in a race, operating screws $O_1$, $O_2$, $O_3$—$O_n$ carry cross heads $X_1$ $X_2$ $X_3$—$X_n$ each of which carries two plungers, one series $F_1$, $F_2$, $F_3$—$F_n$ corresponding to the particular horses and the series $G_1$ $G_2$ $G_3$—$G_n$ corresponding to grand totals.

These plungers work in transparent tubes $H_1$, $H_2$, $H_3$—$H_n$, $T_1$, $T_2$, $T_3$—$T_n$ provided with graduated scales $A_1$ $A_2$ $A_3$—$A_n$, $K_1$ $K_2$ $K_3$—$K_n$. The liquid in the tubes is preferably given distinctive colours and it is to be understood that the operating apparatus shown diagrammatically by a screw is intended in the practical form of the apparatus to take the form of a device for giving a predetermined movement for each unit of stake and may be part of a coin-free apparatus of known form which will issue a printed receipt for the amount and the name of the horse backed.

The various horse total tubes $H_1$ etc., are connected by transmission tubing $L_1$, $L_2$, $L_3$—$L_n$—which does not require to be of accurate bore as it is always filled—to corresponding apparatus at other betting stations and the grand total tubes are all connected together by tubing M as well as to the corresponding tubes at other stations.

The movement of the displacing plungers causes level of the liquid in all connected tubes to move by the same amount.

At any given time, at each station will be indicated the total amount laid on each horse and alongside the total amount laid on all horses and the relative heights of liquid in adjacent tubes give an indication of the odds.

Figure 2:
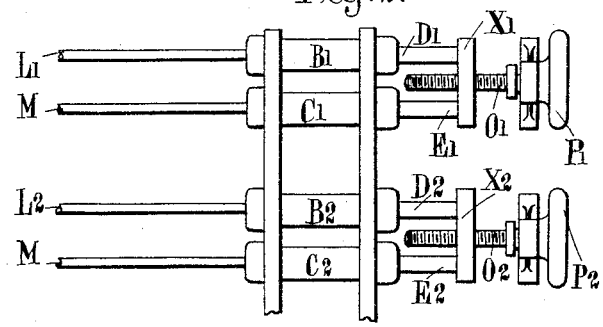
Fig. 2 represents part of an apparatus in which predetermined amounts of fluid are introduced by packed rams in cylinders for use with all indicating stations at the same level.

Referring to Fig. 2 of the drawings this illustrates a form of the apparatus in which instead of employing displacers in the form of plungers acting in the indicating tubes, rams $D_1$, $E_1$, $D_2$, $E_2$ etc., are employed acting in cylinders $B_1$, $C_1$, $B_2$, $C_2$. The cylinders $B_1$, $B_2$ communicate by pipes $L_1$, $L_2$ to the open ended horse indicating tubes containing liquid at common level at the various stations, and the cylinders $C_1$ $C_2$ are connected by pipes M to all the grand-total tubes; the associated pairs of rams are carried by crossheads $X_1$, $X_2$ operated by screws $O_1$, $O_2$ turned by handle-wheels $P_1$ $P_2$.

Figure 3:
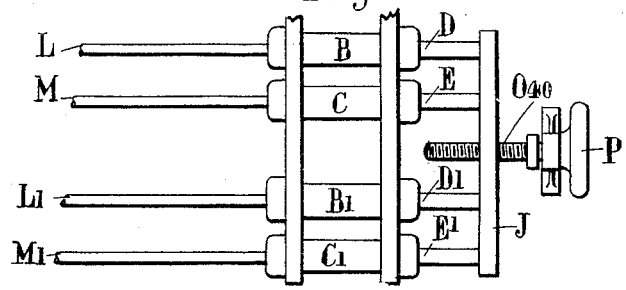
Fig. 3 represents a portion of a similar apparatus for use with two stations at different levels.

Fig. 3 shows a similar arrangement for operating from one station to give indications at one station at a higher level. In this case the cylinders are duplicated; cylinder B communicates by a horse tube L to stations at the same level and the cylinder $B^1$ by another horse tube $L^1$ at an elevated level. Grand total cylinder C, $C^1$ connects with pipes M and $M^1$ and with the corresponding stations. The rams D, E, $D^1$, $E^1$ are worked off a common cross head J operated by a screw O 40 from a hand wheel P.

While the invention has been described in connection with a wagering system, it is, of course, apparent that such is illustrative of a single use only, with such indicated merely by preference. The invention is equally applicable to department stores, for example, in which the totals of the various departments, as well as the grand total for the store, may be readily determined by the use of the device.

I claim:—

1. A totalizator apparatus comprising a plurality of indicating tubes containing liquid, the liquid level in each tube indicating the total stake laid on each risk, and a tube showing the grand total of stakes laid on all risks.

2. A totalizator apparatus comprising a plurality of liquid level tubes indicating the total stakes laid on each risk and a grand total tube alongside each risk tube.

3. A liquid level totalizator comprising a series of parallel graduated liquid level tubes, one corresponding to each risk, a grand total indicating tube alongside each risk tube, piping connecting all grand total indicating tubes, displacing means in each tube for varying the level of liquid by desired amounts, actuating means for said displacing means so coupled that on moving each actuating means the displacing means for the corresponding risk and grand total tubes are simultaneously operated.

4. A totalizator apparatus comprising a series of liquid level indicating tubes representing risks, a liquid level indicating tube representing grand total, means for displacing liquid in any risk tube corresponding to the amount laid on said risk, and means for simultaneously displacing liquid in the grand total tube to add a corresponding amount to the grand total indication.

5. A totalizator apparatus comprising a plurality of tubes, and a plurality of coupled liquid displacers, one of each of said pairs displacing liquid in a specific tube corresponding to said displacer and the second of each of said pairs of displacers displacing a proportional quantity of liquid in a tube common to all the second displacers so as to indicate in said common tube the total displaced by all of the said first displacers into all said specific tubes.

In testimony whereof I affix my signature.

BARRY HOCKEN.